United States Patent
Wu et al.

(10) Patent No.: US 7,359,910 B2
(45) Date of Patent: Apr. 15, 2008

(54) SCALABLE TRANSFORMATION AND TREE BASED QUERY LANGUAGE NODE—SET SELECTION

(75) Inventors: Haoran Andy Wu, Sammamish, WA (US); Yosseff Levanoni, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 11/171,803

(22) Filed: Jun. 30, 2005

(65) Prior Publication Data

US 2007/0005624 A1 Jan. 4, 2007

(51) Int. Cl.
*G06F 7/00* (2006.01)
*G06F 17/00* (2006.01)
*G06F 17/30* (2006.01)

(52) U.S. Cl. ............... 707/101; 707/100; 707/1; 707/2

(58) Field of Classification Search ............ 707/1, 707/2, 100, 101
See application file for complete search history.

(56) References Cited

U.S. PATENT DOCUMENTS

| | | | |
|---|---|---|---|
| 2002/0129023 A1* | 9/2002 | Holloway et al. | 707/10 |
| 2003/0036966 A1* | 2/2003 | Amra et al. | 705/26 |
| 2004/0083209 A1* | 4/2004 | Shin | 707/3 |
| 2004/0172591 A1* | 9/2004 | Rothschiller et al. | 715/503 |
| 2005/0050059 A1* | 3/2005 | Van Der Linden et al. | 707/100 |
| 2005/0080864 A1* | 4/2005 | Daniell | 709/206 |
| 2006/0123077 A1* | 6/2006 | Munetsugu et al. | 709/203 |

OTHER PUBLICATIONS

PCT Search Report, PCT/US06/17202, filed May 5, 2006.

* cited by examiner

*Primary Examiner*—Sam Rimell
*Assistant Examiner*—Jared M Bibbee
(74) *Attorney, Agent, or Firm*—Theodore M. Magee; Westman, Champlin & Kelly, P.A.

(57) ABSTRACT

A method and apparatus for transforming large messages using a scalable process. This scalable process decomposes the message into nodes and node values. Navigation between related tree node tree is carried out based upon the decomposed message. Following decomposition a first node to be transformed is retrieved. Following retrieval of the first node a second node to be transformed is requested. The process obtains the node from the node files. This process repeats until the message is transformed.

15 Claims, 6 Drawing Sheets

SCALABLE TRANSFORMATION AND TREE BASED QUERY LANGUAGE NODE—SET SELECTION

BACKGROUND

The current business environment is very different from what it was just a few years ago. Today's organizations embrace the global marketplace, and this dictates a need to be able to efficiently operate at all times. Customers are now more sophisticated which translates into an accelerated pace of business and decision-making processes. Further, business relationships have become highly dynamic, and customers expect businesses to adapt quickly.

Technical and operational challenges abound as well. There is a need to support multiple applications on a variety of platforms, and to integrate with companies using the Internet, extranets, business to business (B2B) exchanges, and other resources.

Businesses have typically used a variety of mechanisms to control and analyze business operations such as accounting, payroll, human resources, employee tracking, customer relations tracking, etc. Tools which provide these functions are often implemented using computer software. For example, a software package may manage business accounting, another software package might be responsible for receiving new orders, yet another software package will track warehouse inventory and still another package may handle order fulfillment and shipment. In another example, a business software package operated by one business will need to exchange data with a software package operated by another business to allow a business-to-business transaction to occur.

When business tools are implemented in software, it is not unusual for proprietary software packages to be responsible for each individual business task. However, this implementation is cumbersome and requires the same data to be entered in differing formats among the various business applications. In order to improve efficiency, integration applications have been developed which are used to integrate various elements of one business application with elements of another business application.

For example, if a software package, which is used to obtain new orders, includes data fields (or "entries") referred to as CustomerNameLast and CustomerNameFirst, it is a relatively straightforward process to map those entries to an accounting software program having the data fields BillingAddressFirst and BillingAddressLast. In such an integration system, the relationship between entities in one system (i.e., computer system or application) and entities in another system can be stored in tables. A system administrator can configure entity mapping between the systems by selecting between the various entities of the two systems.

An integration server needs to deal with various types of messages. One type of messages is based on the standard XML format. XML message typically have to be transformed into a format so that line-of-business (LOB) applications can understand and thus process the resulting messages. As a transformation standard recommended by the World Wide Web Consortium (W3C), the Extensible Stylesheet Language for Transformations (XSLT) plays an integral role in the business of integration with input being XML messages. Also, a standard by W3C, Xml Path Language (XPath) provides a syntax to describe and retrieve parts of XML messages.

Any platform that supports XML may also require an XSLT transformation and XPath node-set selection engine. An XPath node is one of the components that forms an XML document. One typical way of handling an incoming XML message is to load it in its entirety into memory by maintaining relationships between nodes in the message, and then the in-memory representation is processed accordingly. However, large messages may not necessarily be loaded in memory all at once. Messages with a large memory footprint most likely downgrade the performance of the system, if not halt it. This may result in an end user either seeing an out-of-memory error or messages not being processed correctly.

However, XPath queries fundamentally require navigation capabilities inside the source document (e.g., from a node, move to the parent node, or to a sibling node, or to a child node). These operations are easily implemented in memory where the respective nodes are linked using memory pointers. However, in the source serialized XML documents, such navigation is very inefficient because records do not have fixed sizes nor do nodes in the serialized XML messages contain pointers to their parents or siblings.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment is directed towards a method and apparatus for processing or transforming large messages through an enterprise integration server. A flexible transformation engine typically provides a framework that makes it feasible to allow various implementations of node retrieval to be plugged in, while the framework itself controls how node navigation works. A standard implementation loads the entire input in memory. In contrast embodiments of this method provide a scalable solution such that only a small number of XML nodes reside in memory at any one time. This alleviates memory consumption significantly for large input messages.

In some described embodiments pre-processing occurs prior to message transformation. The pre-processing creates temporary files that preserve XML nodes from an input message, relationships, and their possible values in a form that allows easy navigation that is not available generally in serialized XML messages.

Once a transformation process is started, the framework asks for these XML nodes, and for certain other nodes, and their respective values. Retrieved nodes are stored in an in-memory node cache to maximize reuse for navigation later on. The node cache works closely with an underlying file-based stream that represents the temporary files for the input message. When the cache is full and space is needed for a new node, the least-recently used node(s) are removed. By allowing only a certain portion or number of nodes in the cache, the memory footprint of the message remains flat. The size of the cache is also configurable if desired by the end user or the developer. The same approaches can be applied in the case of XPath expression evaluation for node-set retrieval.

DETAILED DESCRIPTION

Figure 1:
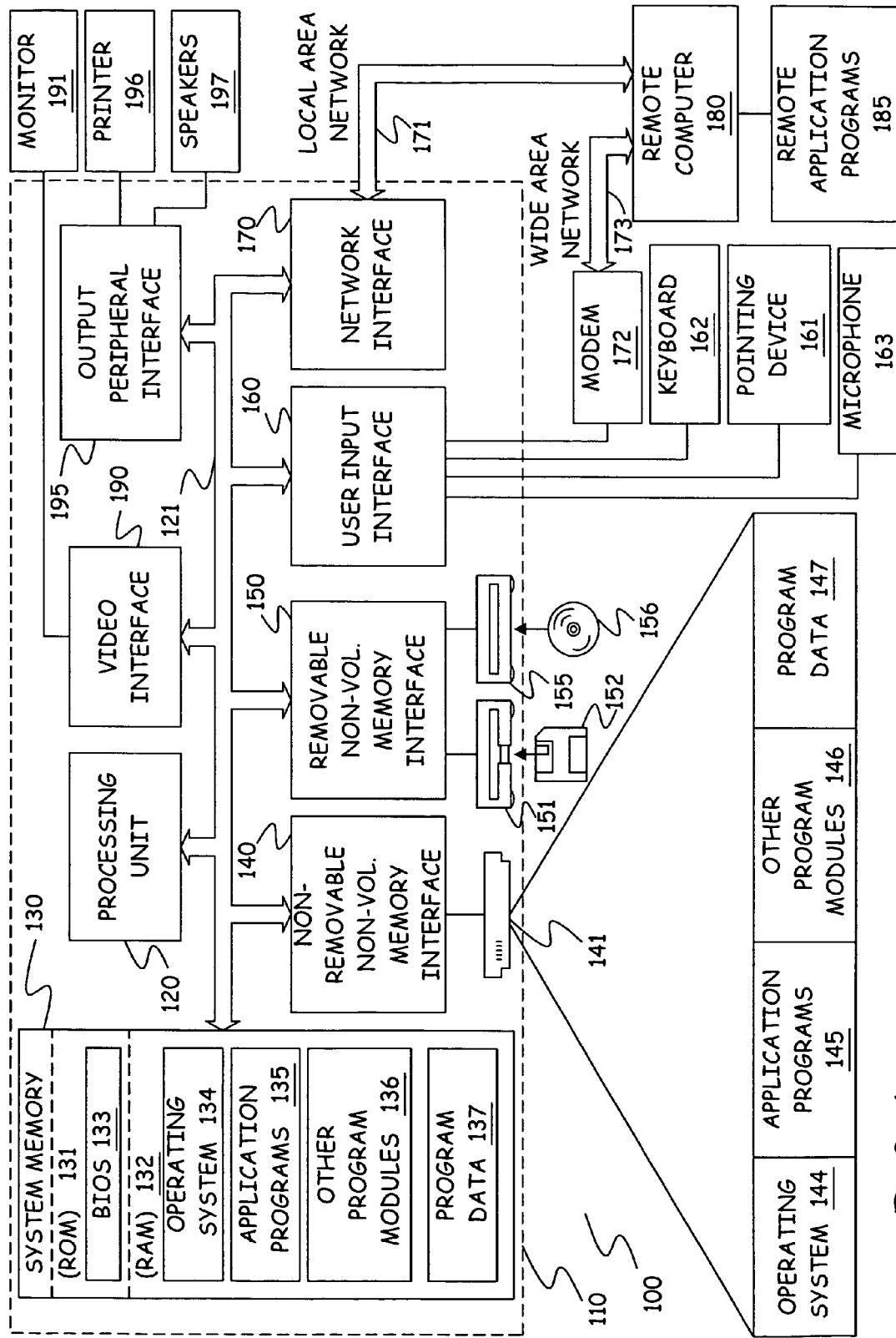
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
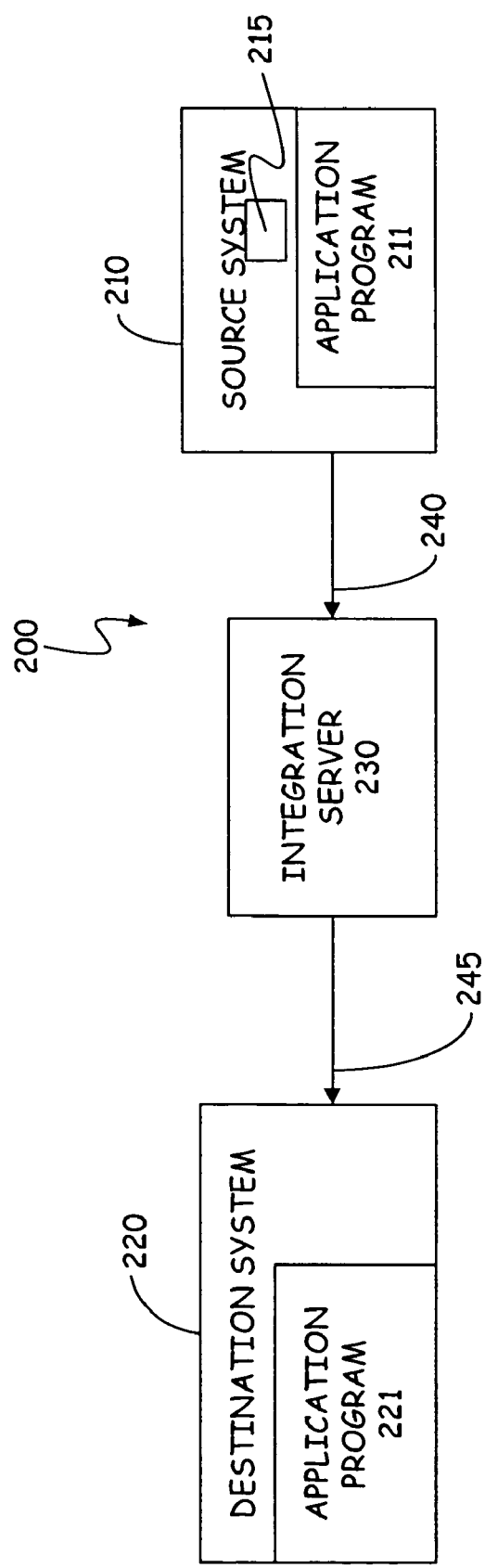
FIG. 2 is a block diagram illustrating an exemplary network environment in which the present invention can be implemented.

FIG. 2 is a block diagram illustrating a network environment in which the present invention can be implemented. Network 200 includes a source system 210, a destination system 220, an integration server 230, and document transports 240 and 245. Source system 210 is, in one embodiment, a computer, such as computer 110 or another system having an application program 211 that produces documents or messages 215. System 210 can be remote from or local to integration server 230.

Similarly, system 220 can be a computer having an application program 221 that can receive documents or messages 215. Documents and messages are transported to and from integration server 230 via transports 240 and 245. Transports 240 and 245 can include hypertext transfer protocol (HTTP), secure hypertext transfer protocol (HTTPS), simple mail transport protocol (SMTP), Microsoft Message Queue (MSMQ) or other known transport protocols. Of course, the transports can be bidirectional but are simply shown in a context in which system 210 is the source and system 220 is the destination, by way of example.

Application program 211 produces a document or message 215, such as a sales order which is needed by application program 221. Messages are illustratively documents that have additional information attached to them, such as headers or footers which produce information regarding the information contained in the document. However, because application program 211 and application program 221 reside on different computers, and may use different formats or structures for data in a document, the document 215 must be transformed or altered so that application program 221 can read and understand the incoming document.

Integration server 230 provides this functionality by converting or transforming the format of the document 215 from application program 211 to the format of application program 221. Integration server 230 can be a computer (such as computer 110 in FIG. 1), a network server or any other information processing system. It should be noted that while only one integration server 230 is illustrated, systems 210 and 220 can be connected through multiple servers 230. Further, messages 215 can be passed through multiple servers 230 to reach the destination system 220.

Figure 3:
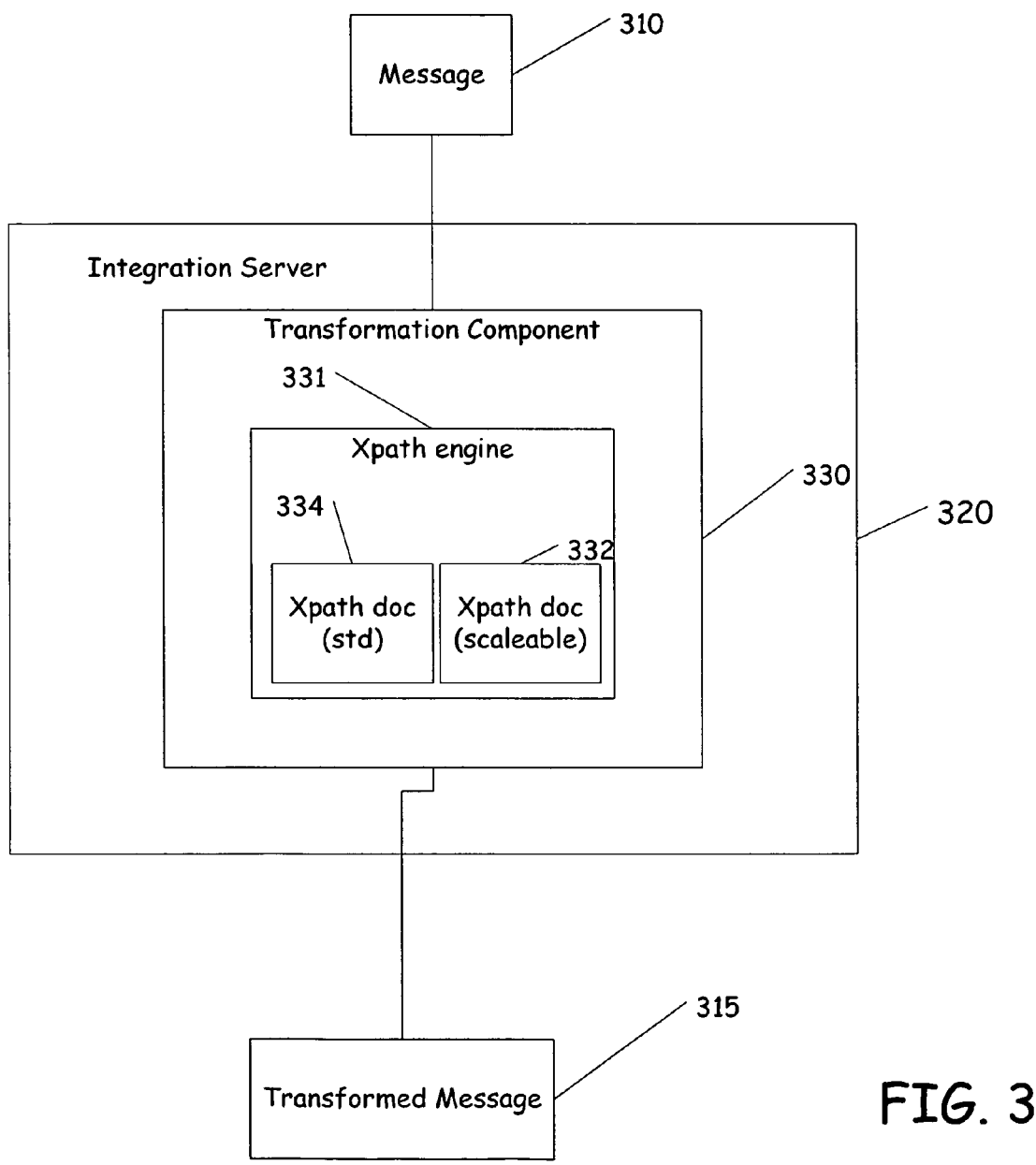
FIG. 3 is a block diagram illustrating the flow of a message through an integration server.

FIG. 3 is a block diagram illustrating an example of a message transformation through an integration server. A message 310 is received at the integration server 230. The message 310 is then passed to a transformation component 330 of the integration server. The transformation component 330 has a first preprocessor 331 configured to determine if the size of the message 310 exceeds a predetermined threshold value. Based on the size of the message 310 relative to the threshold value the first preprocessor will either send the message to a standard transformation component 332 or a scalable transformation component 334.

A transformation or translation of information is often necessary, because input and output formats of the systems receiving and generating message 310 and 315 respectively, frequently do not match. As these formats may not match they need to be altered so that fields from one format match the fields of the other format during the transformation process. The transformation process, although by definition alters at least the format or structure of the data in the message 310, does not necessarily delete the information and replace it with completely different data.

This change can include adding additional data to the message such as illustrated in the following example.

Input Message

```
<books>
        <book>
                <title>Nickled and Dimed</title>
                <price>8</price>
        </book>
</books>
```
The Xpath query /books/book[0]/title/text( ) yields the string "Nickled and Dimed".
In this example the input message is queried. Then the query is used in an XSLT
transform to transform that data to the outgoing message.
```
        <html xsl:version="1.0"
                xmlns:xsl="http://www.w3.org/1999/XSL/Transform"
                xmlns="http://www.w3.org/TR/xhtml1/strict">
        <body>
                <p>You bought the book: <xsl:value-of
select="/books/book[0]/title/text( )"/></p>
        </body>
</html>
```

-continued

Thus, the output following the query and transformed for the above message is:
```
<html xsl:version="1.0"
      xmlns:xsl="http://www.w3.org/1999/XSL/Transform"
      xmlns="http://www.w3.org/TR/xhtml1/strict">
  <body>
    <p>You bought the book: Nickled and Dimed</p>
  </body>
</html>
```

Following the transformation the transformed message 315 is output from the component 330 to the destination application or file. However, during message transformation on an integration server it is possible for the messages to be large in size or so numerous that the processing of these messages can cause the integration process, or other processes running on the server to slow or even halt because of excessive use of the memory. Therefore, the transformation component 330 of the integration server 320 is configured to perform a scalable transformation or a standard transformation on the messages or documents transmitted for transformation through the integration server 320.

Figure 4:
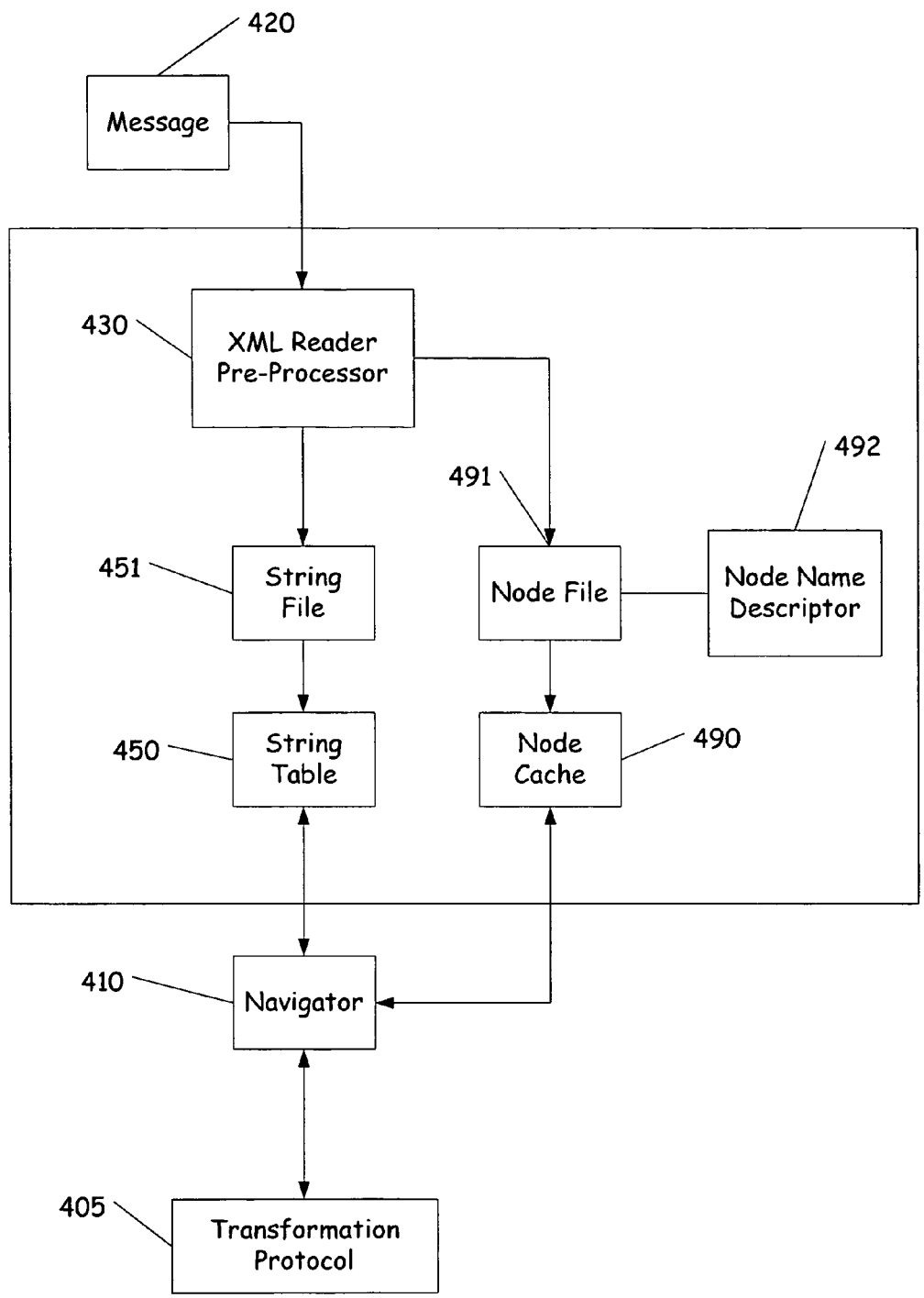
FIG. 4 is a block diagram illustrating the components of the scalable transformation component of FIG. 3

Prior to discussing the process of transformation through the scalable transformation engine or system 334 the components of the scalable transformation engine will be discussed. FIG. 4 is a block diagram illustrating the components and flow of data through the transformation system 400, which is similar to engine 334, according to one embodiment. Transformation system 400 includes a scalable Xpath Navigator 410, a scalable Xpath Document or other input message 420, an XML reader preprocessor 430, string table 450, and a node cache 490.

One exemplary embodiment uses an XPath specification that defines a document model similar to that used by XML. However, other tree based query languages can be used. A brief discussion of these types of query languages is now provided for clarity.

Both types of specifications assume a tree of nodes. Generally the nodes are of the following types: root, element, processing instruction, comment, attribute, text, white space, significant white space and namespace. However, other nodes types can be represented in the XPath or other specification. Furthermore, generally there are additional node types that are addressed by XML but are not represented by XPath. For example nodes related to document definition, entity definition, and entity reference may not necessarily be included in the XPath specification.

A tree based query language, such as XPath is based on the idea of underlying node tree navigability. That is given a current node, an XPath query can refer to the parent, predecessors, children, successors and sibling nodes of the current node. This navigation can go either "up" (e.g., give me my previous sibling or a predecssor) or "down" (e.g., give me my third child).

XML, in a standard serialized format, does not lend itself to this type of navigability. This is caused for two reasons. First, XML is not a fixed-width format. So there is no easy way to "jump" to a next or previous sibling. Second nodes in XML do not contain pointers to the offsets at which their parents, children or siblings are located.

As a result, a common way to evaluate XPath expressions on XML documents is to load the XML document into the system memory, where the relationships between tree nodes are expressed in an object model through direct pointers. This allows the efficient implementation of the navigability desired in the documents.

However, most computer systems today are bound by some memory limits. For instance, some current systems are limited to a 2 GB user virtual address space for memory. However, not all of this space may be used all at once for loading XML documents into memory, due to other processes using this space and due to the desire to not downgrade the system performance. As a result, it is impractical to use in-memory representations for XML documents larger than a few hundred MB.

Files, however, on most computer systems, are not constrained by a memory (e.g. 2 GB) size limitation. In fact, many contemporary file systems allow files much bigger than that. For example in one common operating system the file size limitation is 4 GB. However, when accessing data from a file, the process is much slower compared with accessing data contained in the memory.

One exemplary embodiment illustrates a method to take advantage of the file system to temporarily store large XPath documents so that large XPath documents that do not fit within the memory limitations, but do fit on the disk (or other file storage system or media) can be handled relatively efficiently. Again, XPath is sued by way of example only, and the invention is not so limited. This embodiment also allows navigation between related tree nodes, as required by XPath, to be carried out in O(1) time. This embodiment also reduces disk access by utilizing an in-memory cache.

Prior to discussing the various embodiments, the following definitions and assumptions which are in-line with the standards defined in XML Path Language (XPath), version 1.0. are introduced to assist in the understanding of these exemplary embodiments and other embodiments. In particular the definitions for normal node, nesting node, string-valued node, normal children list, attribute children list, namespace declaration list, and namespaces in-scope list are provided. However, it will be appreciated that these are exemplary only and the invention is not so limited to this particular standard, but is equally applicable to other systems as well.

A normal node is a node which is a text node, white space node, significant white space node, element node, root node, comment node or processing instruction node.

A nesting node is either a root node or an element node.

A string-valued node is a comment node, a white space node, a significant white space node, a text node, a processing instruction node, an attribute node or a namespace node.

It should be noted that a node in a document is either a string-valued node or a nesting node but never both.

A normal children list is the ordered list of normal children of a particular nesting node. An attribute children list is the list of attribute nodes of a particular nesting node.

A namespace declaration list is the ordered list of namespace children node of a particular nesting node, introduced by the nesting node itself. If an element node does not have normal children then it is empty (but not that even an empty element may still have attribute and/or namespace children).

Note that any given tree node can be in only one of the above three list types, depending on its type. Also note that since the XPath model is that of a tree, a node can only appear in a single list instance. Therefore, it is possible to maintain these lists using intrinsic list pointers inside the node structure.

For any node in the tree, there is a set of namespace declarations that are in effect for the node. This forms a namespaces in-scope list. This list is comprised from the aggregation of all those namespaces introduced by predecessors of the current node, and by the current node itself, with the more nested declarations overriding outer declarations.

The namespaces in-scope list, unlike the other three lists, does not have its nodes linked in the nodes' structure. Rather, it is inferred by an iterative process where the namespaces nodes are collected on each nesting node and are aggregated along the path from the root to the node in question. This process happens whenever the list is requested and the resulting list is handed to the requester but is not otherwise persisted in the nodes' tree structure.

Generally, it is possible to author a well-formed (i.e., legal) XML document without any specification for the node structure and the values of text nodes. The following is an example of an XML entry:

```
<?xml version="1.0" encoding="utf-8" ?>
<words>
    <It/>is possible<to author="a well-formed (i.e., legal)"/>Xml document
    <without/>any specification for the node structure and
    <!-- the values of text nodes. The -->
    <?following is an example?>
</words>
```

In the above example, both the node names (e.g., the element named "It") as well as the nodes' values (e.g., the value of the attribute "author") were completely open-ended. However in most XML systems, the structure of a document is much more rigid and is controlled by a schema. Only elements and attributes that have been declared by the schema are usually allowed. For example, the next sample renders the text above in accordance with a simple schema:

```
<?xml version="1.0" encoding="utf-8" ?>
<Section>
    <Paragraph>
        <Sentence>
            It is possible to author a well-formed (i.e., legal) Xml
                Document without any specification for the node
                structure
                and the values of text nodes
        </Sentence>
        <Sentence>
            The following is an example
        </Sentence>
    </Paragraph>
</Section>
```

Adherence to schema has a major implication for the representation of nodes. If the document adheres to a schema, then the number of distinct node types and node names, even in a very large document, is bound by the size of the schema for the document. For instance, a huge book containing millions of words is still comprised of the basic schema elements: Chapters, Sections, Paragraphs and Sentences. Therefore information about the type of nodes and names can be kept in-memory in the case of a document that adheres to a schema.

Referring again to FIG. 4, the Xpath reader preprocessor 430 takes as an input a streaming XML source such as the scalable Xpath document 420, and parses it into the various in-memory and on-disk data structures described above. The preprocessor 430 also generates two files, a string file 451 and a node file 491 which are discussed in greater detail below. A streaming XML source tokenizes an XML message into simple small-sized elements and it does not need to keep track of the entire message in memory.

The preprocessor 430 begins the preprocessing process by initializing two special nodes in the node file 491.

The first special node is the root node for the document and it is assigned an ID number zero. This node is part of the XPath document model but is not generated by the Xml reader preprocessor 430 and therefore needs to be manufactured manually. In accordance with Xml Path Language (Xpath) version 1.0, as one exemplary embodiment, a node name descriptor 492 for the root node is created with XmlLang, Prefix, LocalName, Name and Namespace all set to an empty string. This is described in greater detail with respect to Table 2. The BaseURI for the root element is set to the BaseURI of the Xml reader preprocessor 430. This typically identifies the source URI from which the Xml reader was retrieved.

The second special node is a namespace declaration that is implicitly defined for each XML document and associates the prefix "xml" with a URI or other web address that defines a standardized approach to a schema. Currently one standardized web address is http://www.w3.org/2000/xmlns. First a node name descriptor is created with all fields set to their default state except for the LocalName field which is set to the name of the prefix---"xml". This is in accordance with XPath. Then, the string "http://www.w3.org/2000/xmlns/" representing the URL or web address is added to the string table and the handle value for the string is stored. Finally, a new node is created with the fixed ID number one and its value is set to the recorded string handle. This special XML namespace node (number one) is in one embodiment added to the list of in-scope namespaces when a special flag is set by the XPath engine.

While pre-processing a document through the XML reader preprocessor 430 some context information can be kept to maintain the parent-child-sibling links in the nodes that get built. This is done using a stack which contains all the nesting nodes that are in-scope for the XML reader preprocessor 430. Initially, the context stack contains just the special root node. As elements are entered, a context is pushed onto the stack and, as the elements are exited, their context is popped off the stack.

In one embodiment the context contains just node IDs, not actual references. It contains the ID of the nesting node that is the owner of the scope, and it also contains three list pointers for each of the three children lists associated with the nesting node. For example, it contains a list start pointer and a list end pointer for the normal children list, the attribute children list and the namespaces children list.

Processing the XML input message 420, to build the node tree or identify the nodes, in one embodiment takes the form of advancing the reader 430 to the next token and processing all nodes that are affected by this token. In general, multiple nodes need to be updated for a single input token. For example, when a "start element" token is read potentially up to three nodes may need to be updated. First, a new element needs to be recorded when the new element token is encountered. Second, if the new element has a previous sibling the NextSiblingId field of the previous sibling node needs to be updated to point at the new element. Finally, if the new element is the first normal children of the parent nesting node then the FirstChildId field of the parent needs to be updated to point at the new element.

The preprocessor 430 is in one embodiment configured to require only a single valid node cache element at any given moment. This is because any two nodes may map to the same cache entry and thus may never be accommodated simultaneously. Given this single-node constraint, the following illustrates a new node is added to the node tree structure according to one embodiment.

First, all relevant information about the new node is retrieved from the XML reader 430. This can include the XmlLang, BaseURI, LocalName, Name, Namespaced and NodeType values and whether the node is an empty element. This information is used to find or allocate a node name descriptor 492 for the new node.

Second, the parent node context is retrieved from the top of the node context stack. This context contains the ID of the node that is the parent of the node that is now added. Recall that the context stack resides in memory and contains the nesting node ID and first/last list node ID for each of the three children lists belonging to the nesting node.

Third, if the node is a string-valued node then the string value is read from the XML reader 430 and the string is added to the string table, and the resulting string handle is temporarily recorded.

Fourth, a new node record is created for the new node and the following fields are initialized. The ParentId is initialized from the node context. The PrevSiblingId is initialized from the last node ID reference in the respective list in the node context. If the node has a string value, then the ValueHandle field is set to the recorded string value handle. This process will be discussed in greater detail below with regards to the string table.

At this point in the process the new node is no longer required to be in the node cache 490 and it may be removed from the cache 490 to accommodate the next node which will be required.

The next node to be fetched is either the parent node or the previous sibling node, depending on whether a previous sibling node exists or not. If a previous sibling exists then that node's NextSiblingId field needs to be update. Otherwise, the parent's FirstXXXId field needs to be updated because the new node is the first one on the parent's list. Thus, the relevant field is updated, and the parent or previous sibling node may be removed from the cache 490.

The parent node context is updated accordingly again noting that the new node is currently the last one on the respective list and potentially also the first one on that list (if the list was empty before). Finally, if the node is a nesting node and is not empty then a context is created for it and all the lists' headers in the context indicate they are empty.

When a nesting node end token is encountered, the respective node context is popped off the stack. Using this tree traversal and reflection mechanism the entire message is processed into the on-disk node structure.

In one embodiment an XPath document is decomposed into two files used to represent an XPath document. The first is the string file 451 and the second is the node file 491. The string file 451 contains string values, typically the string value of string-valued nodes. The strings are stored, in one embodiment, using UTF-8 encoding with the number of bytes preceding the actual bytes encoded the in the file. However, other encoding methods can be used. The string file 451 illustratively supports two simple operations; an append string operation, and a look-up string operation.

The append string operation takes a string and converts it to UTF-8. It then seeks to the end of the file and notes the current length of the file in a temporary variable. Next it writes to the file the size of the UTF-8 byte array that follows. Then it writes the actual UTF-8 byte array, and returns to the caller the offset at which the string was stored.

The lookup string operation, given a string offset in the file, seeks to that offset and reads the UTF-8 array length from that location. Then it reads as many bytes as indicated by the length field, and turns them into a string. The resulting string is returned to the caller.

The first two bytes in the string file are skipped so that no string is given the id of zero or one. These values are reserved as explained below, with respect to an in-memory string table.

The node file 491 is in one embodiment a file containing fixed size records representing nodes in an XPath document 420. In one embodiment, each record in the node file has 7 integer fields. However, any other number of fields can be used. The size of the integer fields determines the maximal size of documents that may be supported. In one embodiment 64 bit integers are used for each of the fields.

Each node resides in a file offset which is a multiple of the record size. For example, if using 64 bits then the record size is 8*7 bytes or 56 bytes. This multiple is termed the node's ID.

Given a node ID, retrieving the node's record is performed by multiplying the ID by the fixed record size, seeking to the resulting location and loading the node's record from that position.

The names and semantics for an example of a seven node record field are illustratively provided in Table 1 below:

TABLE 1

| | |
|---|---|
| NameDescriptorId | Identifier of the node's name descriptor (see below). |
| ParentId | Node ID of the node's parent, or −1 if the node is a root |
| NextSiblingId | Node ID of the node's next sibling, or −1 if there is none. |
| PrevSiblingId | Node ID of the node's previous sibling, or −1 if there is none |
| FirstNsId | Node ID of the node's first namespace node child, or −1 if there is none |
| FirstChildId | Node ID of the node's first normal node child, or −1 if there is none |
| FirstAttributeId | If the node is a nesting node then this is the node ID of the first attribute child attribute of the node, or −1 if none exits. |
| -Or- | |
| ValueHandle | Otherwise, a string ID, referring to the string table (see below) containing the value of the node. |

The string table 450 wraps the string file 451 and provides some amount of in-memory storage. It provides the same interface as the string file; namely the append and look-up operations.

The string table 450 is parameterized with the number of characters it may store in-memory. So long as the number of characters stored in memory is below a threshold, the string table 450 stores the string in an in-memory hash table, associating the string with a negative ID. The string is also added to a set of strings (by reference) so that there are no duplicated strings kept in memory. When the in memory storage is exceeded, the string table starts redirecting append requests to the string file 451.

In one embodiment, two string values are treated specially. Null strings are associated with the ID zero and empty strings are associated with the ID one. Thus, logic for lookup according to one embodiment is described below.

If the ID is smaller than zero, then the lookup operation looks for the ID in the in-memory hash table. If the ID is zero a null string is returned. If the ID is one, an empty string is returned. If the ID is greater than one, then the request is forwarded to the string file.

In one embodiment, all of the pieces of information associated with a node which are schema based or that are otherwise not expected to vary between different node instances are lumped into a node descriptor table 492. In one embodiment, the node name descriptor 492 includes the following fields, that are illustrated in Table 2

TABLE 2

| Name | Type | Description |
|---|---|---|
| NodeType | XPathNodeType | An integer based enumeration with the following possible values: Root, Element, Attribute, Namespace, Text, SignificantWhitespace, Whitespace, ProcessingInstruction, Comment. |
| BaseURI | String | Base URI for the node. |
| Name | String | Node's name.. |
| NamespaceURI | String | Node's namespace URI. |
| LocalName | String | Node's local name. |
| Prefix | String | Node's prefix. As defined in [1]. |
| XmlLang | String | Node's language. As defined in [1]. |
| IsEmptyElement | Boolean | Indicates whether a node is an empty element node. |

Even though the prefix is not defined by the schema, the prefixes are effectively aliases for namespaces which are defined by schemas. In most instances it is unlikely that a document would use many different prefixes to refer to the same schema URI, and therefore, it is assumed that including the prefix in the node name descriptor does not violate the assumption that the entire size of all unique descriptors residing in the table is proportional to the size of the schema (and not to that of the document). This assumption is also applied to the IsEmptyElement and the XmlLang as well.

In one embodiment, a simple design principal guides the design of the name descriptor table. The principle is to extract shared information from nodes and share it in memory. If the information extracted is not really shared (e.g., in the non-schema-based sample document above, node names are not shared between any two nodes in the document) then the size of the name descriptor table can be as large as the original document, and may not fit within memory limitations. Sharing too little information on the other hand hurts performance as it necessitates additional disk accesses.

However moving a piece of information in any direction is straightforward using the string table 450. For example, it is possible to move the XmlLang field from the descriptor into the node record by first storing the string value of this field in the string table and then storing the handle to the string in the node record.

The node name descriptors stored in the node name descriptor table 492 are organized in a vector such that each unique descriptor has an associated unique descriptor ID. Given an ID, one can look up the corresponding descriptor in O(1) time. Also given a descriptor it is possible to see whether there is already an existing descriptor with exactly the same properties or not. This is done using a hash on the fields most likely to disambiguate a descriptor (local name and namespace) Thus looking up an identical descriptor typically takes $$O(\log(N)*(|\text{local name}|+|\text{namespace uri}|)) \qquad \text{Equation 1}$$

time. Where N is the total number of distinct name descriptors in the document. Where the local name is the id number accessed and the namespace uri is the id number of the uri accessed both as defined by the schema used.

The in-memory node cache 490 is a Most Recently Used (MRU) cache of nodes fetched from the node file 491. The nodes, when kept in memory, are similar to the ones kept on disk.

The parent node object, once resolved from the parent node ID, is kept in memory, in a reference field named "Parent" pointing from the child in-memory node to a parent in-memory node. A number of queries are touching the parent path and therefore it is beneficial to keep the node in memory.

The NodeNameDescriptorId is resolved into a reference to the in-memory node name descriptor. There is a Boolean field within the in-memory node indicating whether the node is "dirty" or not. That is, whether the node has changed since it was last loaded from the node file. If the node is dirty, and if it is discarded from the cache, it will have to be re-written to the node file 491.

As discussed later, both the string file 451 and node file 491 are mutable only during the XPath document pre-processing phase and not in the XPath query execution phase. So nodes may become dirty only during pre-processing. During the processing phase, nodes are immutable. Therefore, it is permitted during processing to hold on to a node regardless of whether the cache 490 still keeps a reference to it or not. This feature allows, for example, for a node to hold on to a reference to its parent, regardless of whether the parent is in the cache 490. On the other hand, during pre-processing it is not permissible to hold on to node references because the referents may be flushed out of memory and then reloaded and changed, thus the old copy will not be up to date. The scalable navigator 410 is in one embodiment a Net XPathNavigator that operates on top of the above described in-memory and on-file data structures.

However other processes can be used for the scalable navigator 410. In the embodiment where XPath is used, the scalable navigator 410 provides basic XPath navigation capabilities that are required to evaluate arbitrarily complex XPath expressions using the .Net framework XPath library.

The navigator 410 is a mutable cursor over the nodes' tree. In other words, given a node, it is possible to move to its parents, siblings and children. The children nodes fall into the above defined child node lists, (e.g. normal children list, attribute children list and in-scope children list). However, other children node lists can be used. The scalable Xpath navigator 410 points to a single node at any given moment.

At this point, after pre-processing is complete, at the XML reader preprocessor 430, all the nodes are immutable. Therefore, the navigator 410 holds on to an in-memory node object, regardless of whether the node object is retained in the cache or removed from the cache. When moving to a sibling or parent node, the respective target node ID is retrieved from the current node and then the target node is resolved in the node cache 490. Then the navigator 410 is modified to point to the target node.

When the navigator 410 is instructed to move to the first child, in either the normal children list or the attribute children list, it looks up the first children on the respective list and resolves the target node in the cache, then it makes the target node the current node for the navigator 410.

Finally, when the navigator 410 is instructed to move to the first in-scope namespace node, it first determines the entire node path to the root and keeps this list in memory. Then for every nesting node on the path, the navigator 410 iterates through the local namespace node list, resolving each namespace node and adding them to an aggregating list of namespaces.

At the end of this process there is a single list 402 containing in-memory references to all the namespace's nodes that are in-scope for the current node the navigator is pointing to. The list is then filtered so that any prefixes that have been defined in outer scopes and then have been redefined in inner scopes reflect only the innermost value associated with them.

A transformation protocol 405 or other requestor can choose to either include the special XML namespace node (node number one) in the enumeration or not and the navigator 410 handles a request to include that node by resolving node number 1 and adding it to the node cache 490.

The navigator 410 then holds on to the resulting list and it holds a counter into the list. Further requests to move to the next/previous sibling modify the counter into the list. Finally, when the user instructs the navigator 410 to leave the namespace list and return to its parent, the list is discarded from the navigator 410.

Figure 5:
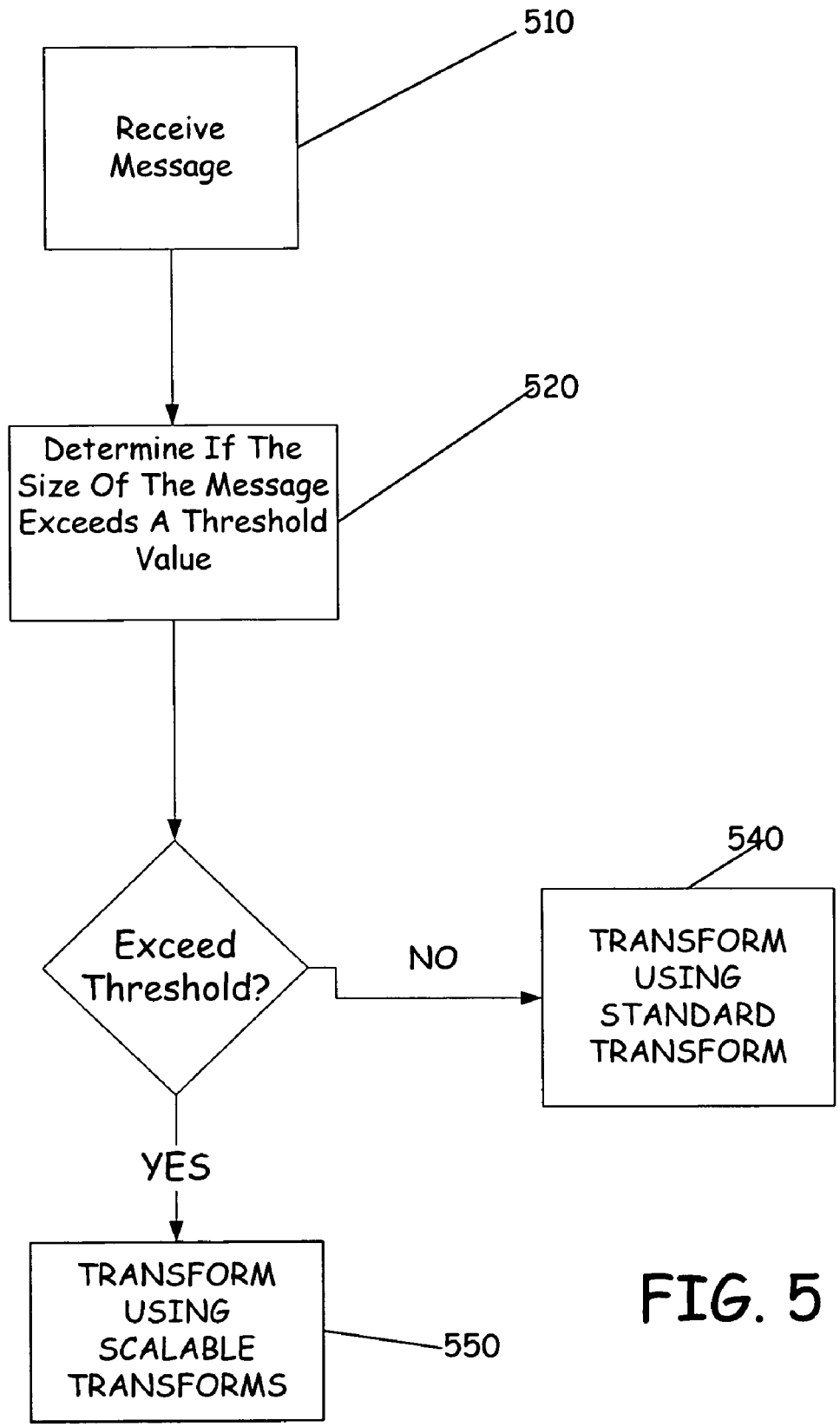
FIG. 5 is a flow diagram illustrating the steps executed during the transformation of a message.

FIG. 5 is a flow diagram illustrating the steps executed when transforming a message according to one illustrative embodiment. The first step of the process is to receive the message from either a message queue or the application program at the transformation component 400. This is illustrated at step 510.

Once the message has been received at preprocessor 331 determines if the size of the message exceeds a predefined threshold value. This is illustrated at step 520. In one embodiment this determination is done by reading in the message until the threshold value is met. In other embodiments the size of the message is determined.

The size of the message relative to the threshold value is important to know, because larger messages require more resources to process. However, when one large message or multiple messages are being processed at one time it is possible for the transformation process to use all of the resources that the application makes available. For example, one messaging framework allows for 1.6 megabytes (GB) of RAM to be used for all processes. A large message transformation can use a large portion of the available RAM thus causing the entire system to slow down, as the amount of resources available to process the transformation is variable depending on the level of activity on the application.

In one embodiment the threshold value is 1 MB. However other threshold values can be used. The selection of this threshold value is dependent upon a number of factors. In particular, the availability of RAM (as determined by the application or the operating system) to process transformations can cause the threshold value to be higher or lower than the 1 MB example given above. For example, if the available RAM exceeds 1.6 GB then the threshold value could be significantly larger than 1 MB. However, if the available RAM is less than 1.6 GB then the threshold value might be less than 1 MB. However, for purposes of this discussion it is assumed that the threshold value is 1 MB.

If the size of the message relative to the threshold is below the threshold value then the transformation of the message occurs according to the standard transformation process used by the integration server for messages. This is illustrated at step 540. If however, the message size is larger than the threshold value then the transformation is done using a scalable transformation process. This is illustrated at step 550. The scalable transformation process that occurs at step 550 is described below with respect to FIG. 6

Figure 6:
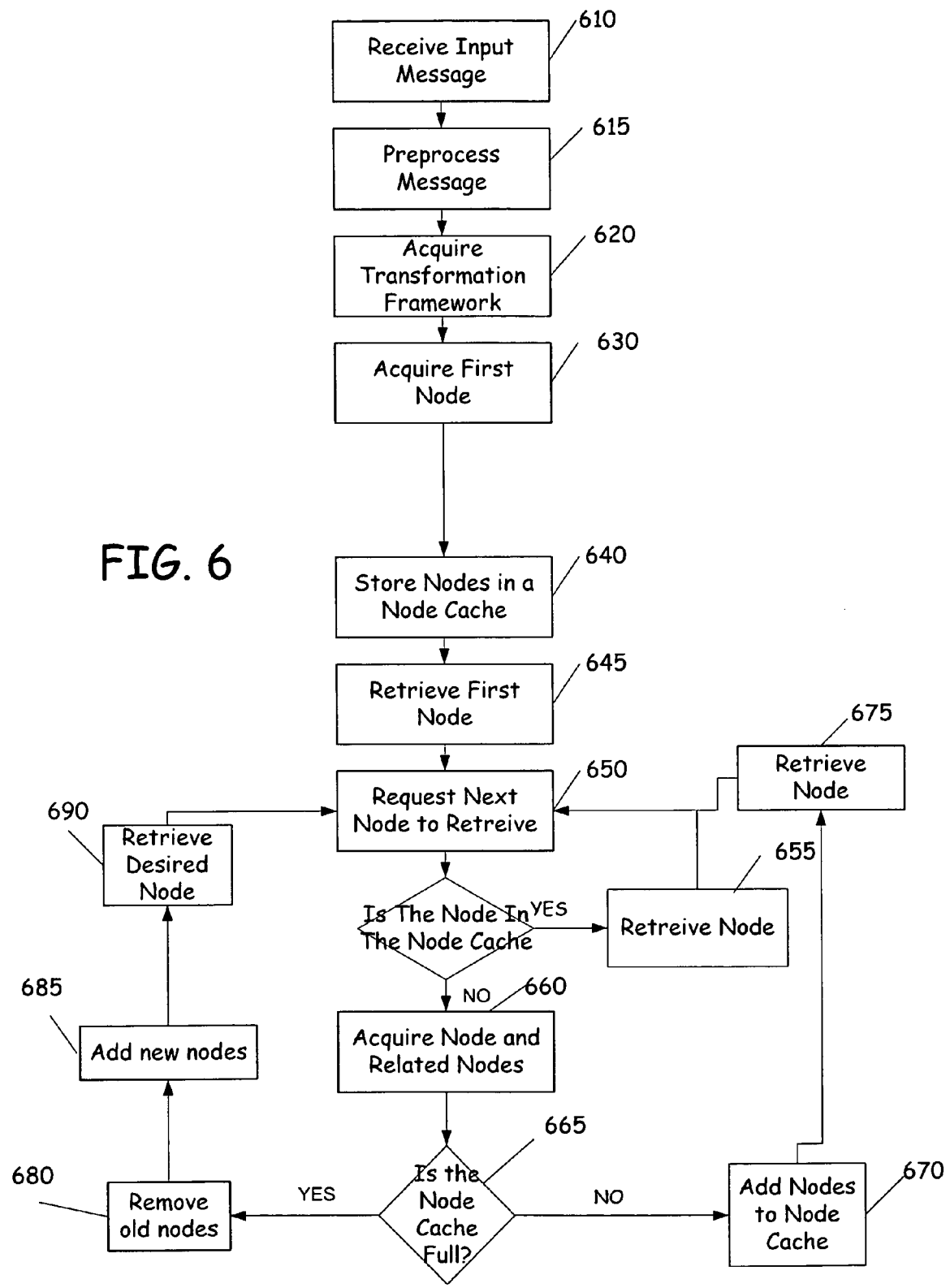
FIG. 6 is a flow diagram illustrating the steps executed by the scalable transformation process when transforming a large message.

FIG. 6 is a flow diagram illustrating the steps associated with the scalable transformation process for transforming a message according to one illustrative embodiment of the present invention. At step 610 a message which exceeds the threshold is received at the transformation component 400. Next the message is passed to the XMLReader Preprocessor 430. At this step all XPath nodes within the message are preprocessed. The process walks through each node in the message and constructs a series of node objects, and values if they're string-valued nodes for the document. These are stored in files 451 and 491, respectively. This is illustrated at step 615, and described in greater detail above.

During this process two files are generated for the message. However, a single file can also be used. The node file 491 is created that maintains the relationship between nodes. The second string file 451 is created that stores the values associated with each node. The node file 491 also includes the pointers that point to locations of the values of nodes in the string file 451. Once the message has been decomposed into the two files 451 and 491 the original message is ignored or otherwise discarded and the process continues with the two files.

Next the process starts to transform the message. The transformation occurs according to the definitions defined by the framework and the transformation protocols that are used by the server. The framework provides a series of instructions that indicate which nodes from the original message are needed for the transformed message and in what order these nodes are needed to effectuate the transformation. The transformation framework is acquired at step 620.

In one embodiment, the size of the node cache 490 is selectable by the developer during development. However, in alternative embodiments, the size of the node cache 490 can be determined at the time of the implementation of the process. The node cache 490 also has node name descriptor 492 that tracks all interned string values associated with the node. Nodes are stored in the node cache 490 by node name or node ID.

The node cache 490 is populated with information related to various nodes. The initial population occurs as the framework makes a series of calls for specific nodes that are to be retrieved to create the new message.

At step 630 the first node to be retrieved is requested by the transformation protocol 405. For purposes of this discussion it will be assumed that the first node requested is "node 15". The navigator 410 then accesses the two files 451 and 491 to gather the information related to "node 15". The transformation component also gathers the information related to of any parent or children nodes that are associated with the desired node. This is illustrated at step 635. In one embodiment the 10 neighboring nodes are also gathered. In other words, "node 10" through "node 20" are gathered. These nodes are then stored in the node cache 490. This is illustrated at step 640.

Once the requested node and the related or neighboring nodes are stored in the node cache, the transformation component retrieves the requested node. This is illustrated at step 645. The actual process of transformation/retrieval is not important to the various embodiments. It is only necessary to know that the node is transformed/retrieved according to a set of rules, such as those discussed above. Therefore, any method of transformation/retrieval can be used.

Following the retrieval of the first node, in this example "node 15," the transformation protocol 405 proceeds to request the next node to be transformed. This is illustrated at step 650. The framework first looks for the requested node in the node cache 490. If the node is in the node cache 490, then the framework transforms the node located in the node cache. This is illustrated at step 655. If the node is not found in the node cache, the navigator 410 requests the node and node values from the files 451 and 491. This is illustrated at step 660. At this step it also gathers the requested node as well as the related nodes.

Prior to placing the new nodes into the node cache 490, the navigator 410 examines the node cache 490 and determines if there is enough space in the node cache 490 to store the newly requested nodes. This is illustrated at step 665. If there is enough space in the node cache 490, the nodes are stored in the node cache 490. This is illustrated at step 670. Following the storage the requested node is retrieved at step 675.

If however, there is not enough space in the node cache 490 for the newly requested nodes the transformation component must remove some of the nodes from the node cache 490. This is illustrated in step 680. In one embodiment the navigator 410 removes the nodes in the node cache 490 that have not been recently used. This strategy for removal is based upon a belief that related nodes are located near each other in the messages, and will therefore have a lower likelihood of being needed later in the transformation process. However, in other embodiments the transformation component can remove nodes that already have been retrieved, there by leaving only the nodes that have not been transformed in the node cache 490.

Once the node cache 490 has enough space to store the newly requested nodes these nodes are added to the node cache. This is illustrated at step 685. Following the addition of the nodes the requested node is retrieved. This is illustrated at step 680.

The process repeats from step 650 until all of the nodes are retrieved Once the nodes are retrieved the transformed message is generated and provided to the receiving or destination application.

Although the present invention has been described with reference to particular embodiments, workers skilled in the art will recognize that changes may be made in form and detail without departing from the spirit and scope of the invention.

What is claimed is:

1. A method for transforming data, comprising;
receiving the data from a first application;
determining if a size of the data exceeds a threshold value;
if the size of the data exceeds the threshold value:
   transforming the data according to a scalable transformation process through steps comprising:
      generating a node file that describes relationships between nodes in the data;
      loading information from the node file into a memory cache such that the information loaded into the memory cache does not exceed the size of the memory cache and such that at no time is information for every node in the node file present in the memory cache, wherein loading information into a memory cache further comprises:
         retrieving information about a first node from the node file;
         placing the information about the first node in the memory cache;
         retrieving information about a second node from the node file;
         determining that the total amount of information stored in the memory cache and the information about the second node together exceed the size of the memory cache; and
         removing from the memory cache information about at least one node such that space in the memory cache for the removed information is made available for the storage of other information; and
         placing information about the second node in the memory cache;
using the information in the memory cache to form the transformed data;
storing the transformed data on a computer-readable storage medium; and outputting the transformed data to a second application.

2. The method of claim 1 wherein transforming the data according to a scalable transformation process further comprises storing a value associated with each node in a string file.

3. The method of claim 2 wherein the node file and the string file arc two separate files.

4. The method of claim 2 wherein the node file and the string file are a single flex.

5. The method of claim 2 wherein the node file includes a pointer to an associated value for the node in the string file.

6. The method of claim 1 wherein loading information into a memory cache comprises:
identifying a predetermined number of nodes related to the first node using the node file;
retrieving information about the predetermined number of nodes from the node file; and
placing the information about the predetermined number of nodes in the memory cache.

7. The method of claim 6 wherein loading information into a memory cache further comprises:
determining a third node to be retrieved;
searching the memory cache for the third node; and
if the third node is in the memory cache, then:
   retrieving information about the third node from the memory cache.

8. The method of claim 6 wherein loading information into a memory cache further comprises:
identifying a predetermined number of nodes related to the second node using the node file;
placing information about the predetermined number of nodes related to the second node in the memory cache.

9. The method of claim 1 wherein removing information about at least one node comprises removing information about a node that is the least recently used nodes.

10. The method of claim 1 wherein removing information about at least one node comprises removing information about a node that has been in the memory cache the longest.

11. The method of claim 1 wherein the threshold value is 1 megabyte.

12. A computer storage medium having encoded theron a message information component comprising:
- A first processor configured to determine a size of a message;
- A second preprocessor configured to decompose the message into nodes;
- A transformation component configured to transform small messages into output messages by storing a structure composed of all of the nodes in the message in a memory, the structure providing relationships between the nodes; and
- A scalable transformation component configured to transform large messages into output messages by storing a structure in memory providing relationships between nodes wherein the number of nodes wherein the number of nodes in the message that is stored in memory at any one time is limited to fewer than all of the nodes in the messages.
- wherein storing a structure in memory comprises:
  - retrieving information about a first node from the node file;
  - placing the information about the first node in the memory cache;
  - retrieving information about a second node from the node file;
  - determining that the total amount of information stored in the memory cache and the information about the second node together exceed the size of the memory cache; and
  - removing from the memory cache information about at least one node such that space in the memory cache for the removed information is made available for the storage of other information; and
  - placing information about the second node in the memory cache.

13. The message transformation component of claim 12 wherein a large message is larger than a threshold size.

14. The message transformation component of claim 12 wherein the second preprocessor is configured to decompose the message into a first file containing reference information related to each node in the message, and a second file containing values for at least one node in the message.

15. The message transformation component of claim 14 wherein the scalable transformation component first looks to the memory for a node to be retrieved prior to obtaining information about the node from the first file.

* * * * *

UNITED STATES PATENT AND TRADEMARK OFFICE
CERTIFICATE OF CORRECTION

| | | |
|---|---|---|
| PATENT NO. | : 7,359,910 B2 | |
| APPLICATION NO. | : 11/171803 | |
| DATED | : April 15, 2008 | |
| INVENTOR(S) | : Haoran Andy Wu et al. | |

It is certified that error appears in the above-identified patent and that said Letters Patent is hereby corrected as shown below:

In column 18, line 24, in Claim 1, after "form" delete "the".

In column 18, line 34, in Claim 3, delete "arc" and insert -- are --, therefor.

In column 18, line 36, in Claim 4, delete "flex." and insert -- file. --, therefor.

In column 18, line 45, in Claim 6, after "placing" delete "the".

In column 18, line 57, in Claim 8, after "file;" insert -- and --.

In column 18, line 62, in Claim 9, delete "nodes." and insert -- node. --, therefor.

In column 19, line 1, in Claim 12, delete "theron" and insert -- thereon --, therefor.

In column 19, line 2, in Claim 12, delete "information" and insert -- transformation --, therefor.

In column 19, line 3, in Claim 12, delete "A" and insert -- a --, therefor.

In column 19, line 3, in Claim 12, delete "processor" and insert -- preprocessor --, therefor.

In column 19, line 5, in Claim 12, delete "A" and insert -- a --, therefor.

In column 19, line 7, in Claim 12, delete "A" and insert -- a --, therefor.

In column 19, line 12, in Claim 12, delete "A" and insert -- a --, therefor.

In column 19, line 15-16, in Claim 12, after "nodes" delete "wherein the number of nodes".

Signed and Sealed this
Fifteenth Day of February, 2011

David J. Kappos
*Director of the United States Patent and Trademark Office*

CERTIFICATE OF CORRECTION (continued)
U.S. Pat. No. 7,359,910 B2

In column 19, line 18-19, in Claim 12, delete "the messages. wherein storing a structure in memory comprises:" and insert -- the messages, wherein storing a structure in memory comprises: --, therefor.